A. MILL.
FRICTION CLUTCH.
APPLICATION FILED MAY 22, 1919.
1,335,748.
Patented Apr. 6, 1920.
3 SHEETS—SHEET 1.
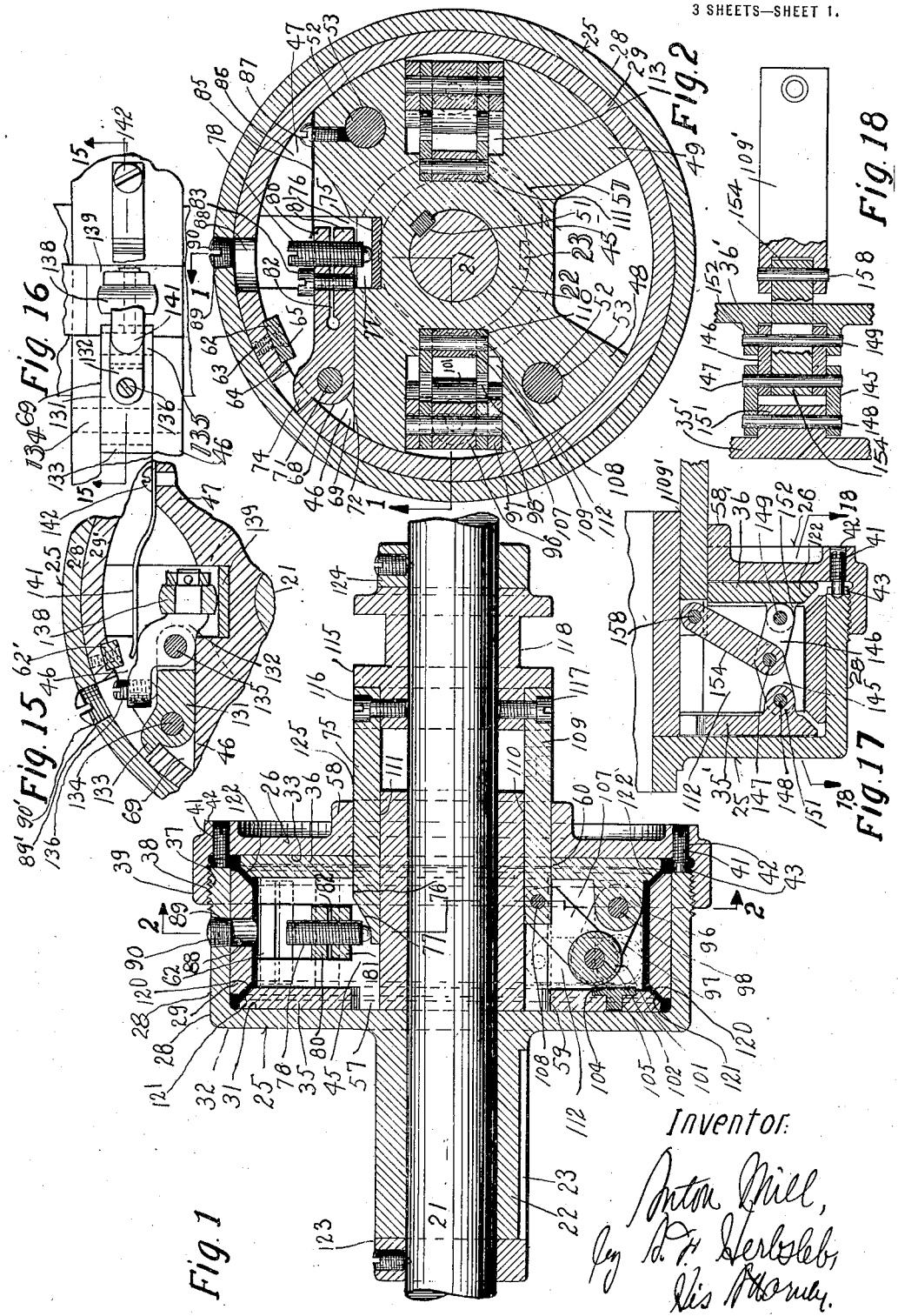
Inventor:
Anton Mill, A. MILL.
FRICTION CLUTCH.
APPLICATION FILED MAY 22, 1919.
1,335,748.
Patented Apr. 6, 1920.
3 SHEETS—SHEET 2.
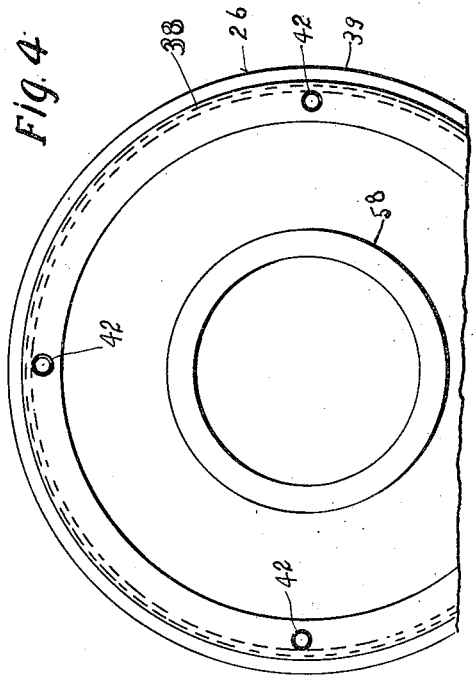
Fig. 4
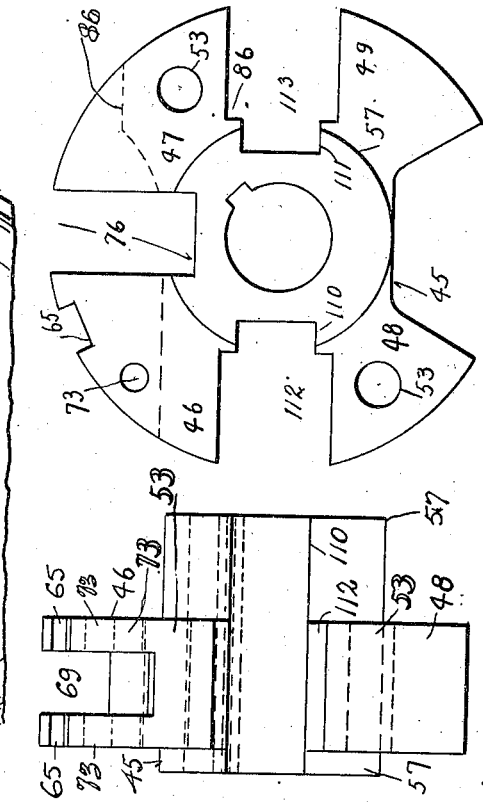
Fig. 5
Fig. 6
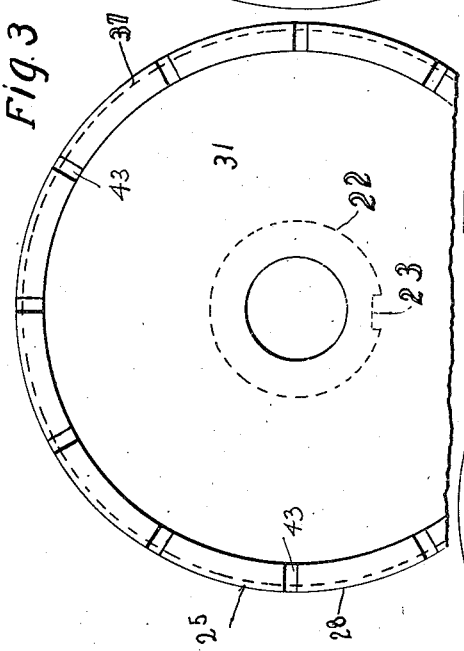
Fig. 3
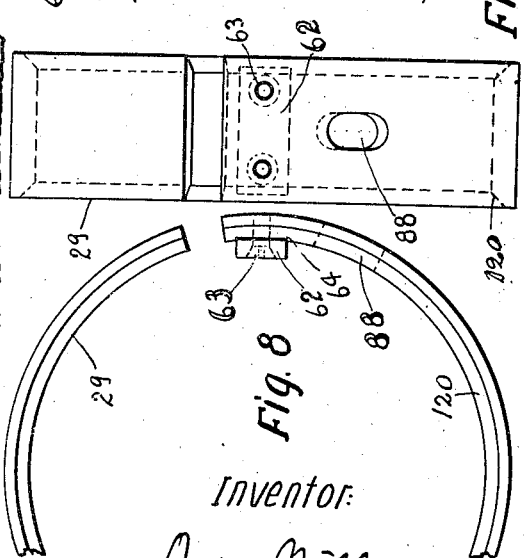
Fig. 7
Fig. 8
Inventor:
Anton Mill,

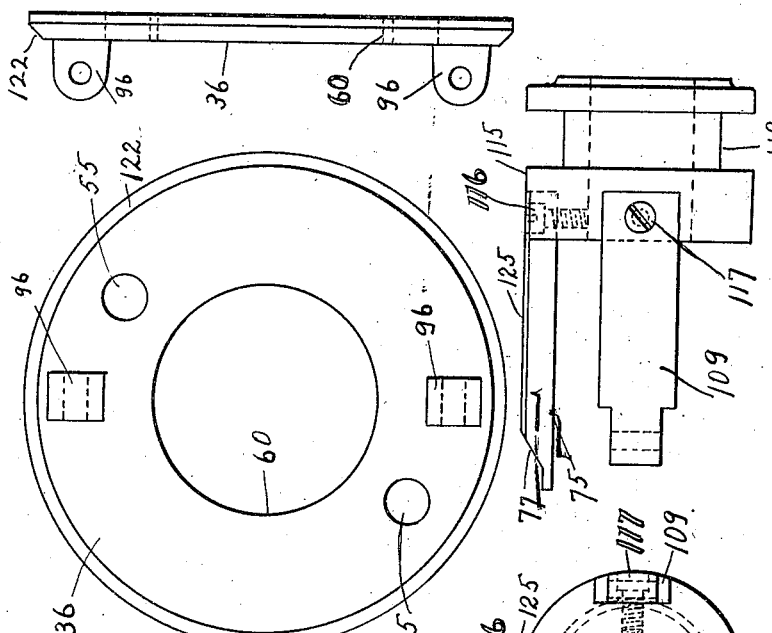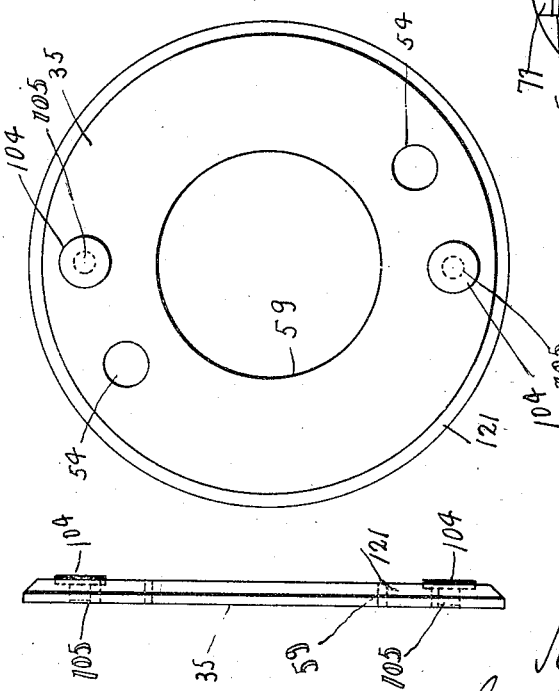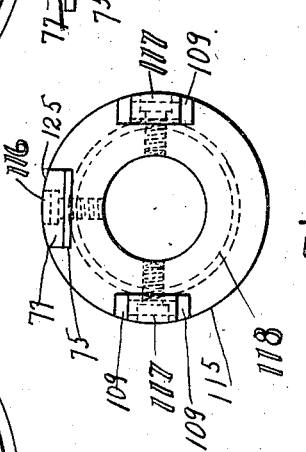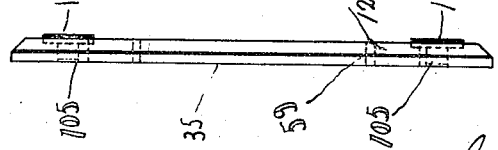

UNITED STATES PATENT OFFICE.

ANTON MILL, OF CINCINNATI, OHIO.

FRICTION-CLUTCH.

1,335,748.

Specification of Letters Patent. Patented Apr. 6, 1920.

Application filed May 22, 1919. Serial No. 298,856.

*To all whom it may concern:*

Be it known that I, ANTON MILL, a citizen of the United States, residing at Cincinnati, in the county of Hamilton and State of Ohio, have invented certain new and useful Improvements in Friction - Clutches, of which the following is a specification.

It is the object of my invention to provide an improved friction clutch embodying peripheral friction means and side friction means connected for combined movements; further, to provide novel means for operating the frictionally engaging parts; further, to provide novel means whereby one of said friction means is arranged to form driving engagement prior to the other of said friction means; and, further to provide a novel friction clutch of compact form and so arranged that a substantially maximum area of frictional engaging surfaces are provided between the driving and the driven members of the clutch to transmit a maximum power by means of a device of substantially minimum size.

The invention will be further readily understood from the following description and claims, and from the drawings, in which latter;

Figure 1 is a central axial section of my improved device, taken on the irregular line 1—1 of Fig. 2.

Fig. 2 is a cross-section of my improved device, taken on the irregular line 2—2 of Fig. 1.

Fig. 3 is an end view partly broken away of the body of the box of my improved device.

Fig. 4 is an end view, partly broken away, showing the cap closing the box of my improved device.

Fig. 5 is an end view of the interior block of my improved device.

Fig. 6 is a side elevation of the same.

Fig. 7 is an edge view of the friction band of my improved device.

Fig. 8 is an end elevation of the same, partly broken away.

Fig. 9 is an edge elevation of one of the friction plates of my improved device.

Fig. 10 is an inside elevation of the same.

Fig. 11 is an inside elevation of the other of the friction plates of my improved device.

Fig. 12 is an edge elevation of the same.

Fig. 13 is an end view of the operating slide.

Fig. 14 is a side elevation of the same.

Fig. 15 is a longitudinal section of a modification of the lever for operating the friction-band, taken on a line corresponding to the line 15—15 of Fig. 16.

Fig. 16 is a plan view of the same, partly broken away.

Fig. 17 is an axial section, partly broken away, showing a modification of the side friction operating means of my improved device; and, Fig. 18 is a longitudinal section of the same, taken on the line 18—18 of Fig. 17, and showing the operating slide in connection therewith.

My improved device comprises a driving member and a driven member, the friction devices being operatively disposed between said members in such manner that the direction of transmission of power is selective between said members, so as to constitute one or the other the driving member or the driven member. For convenience, the driving member and the driven member may be referred to as end elements, and are hereinafter so designated.

In the present exemplification of the invention, a shaft 21 represents one of the end elements, and a hub 22 represents the other of the end elements. A suitable transmitting device may be secured to the hub as, for instance, a pulley arranged to be secured to the hub by means of a key located in a keyway 23 in said hub. The hub is journaled on the shaft.

A box 25 is shown integral with said hub, and has a cap 26 thereon, the axes of the box and cap being coincident with the axes of the end elements. The box is formed with an annular wall 28, the inner peripheral surface of which constitutes an annular friction surface. An annular friction-band 29 is provided with an outer annular friction surface, which coacts with said annular friction surface of said wall.

The inner side face 31 of the radially extending wall 32 of the box constitutes a side friction surface, and the inner face 33 of the cap 26 constitutes a side friction surface. Side friction-disks 35, 36, have side friction surfaces which coact respectively with the side friction surfaces 31 and 33, respectively on the radial wall and cap of the box.

The cap and box have connecting means between them, so constructed as to adjust the distance between said side friction surfaces 31 and 33. These connecting means are exemplified as complemental threads 37, 38, respectively on the box and annular flange 39 on the cap. Positioning screws 41 have threaded engagements in threaded bores 42 in the cap, the ends of said screws contacting the ends of the annular wall of the box for fixing the distance between said friction faces 31 and 33, in conjunction with said threaded connection, the inner ends of said screws being preferably received selectively in end notches 43 in the end of the annular wall of the box for preventing relative turning between said cap and box after adjustment, regardless of direction of rotation between the end elements of the device.

An interior block 45 is received in the box and is provided with radially extending wings 46, 47, 48, 49. The block rotates with the shaft, being fixed thereto by a key 51. Driving connection is also had between the block and the friction-disks by means of pins 52 received through holes 53 in the block and holes 54 and 55 respectively in the side friction-disks 35, 36. Axial movement is permitted lengthwise of said pins between the block and plates, the pins being held in place by the end wall of the box and its cap. The block has a hub 57 on which the bearing 58 of the cap is journaled so as to rotate with the box. The friction-disks are respectively provided with bores 59, 60, the walls of which are supported on said hub.

The outer peripheries of the wings form resting faces for the friction-band when the latter is contracted. A cleat 62 is fixed to the friction-band adjacent to one of its ends, as by a screw 63. The cleat is shown let into a slight recess 64 in said band and into recesses 65 in the wing 46, the walls of said recesses positioning said cleat and the end of the friction-band to which it is secured with relation to the block. The friction-disks limit endwise movement of the cleat and consequently limit lateral movement of the friction-band.

A lever 68 is pivoted in a recess 69 in the wing 46, a pivot-pin 71 being received through a bearing 72 in said lever and bearings 73 in the respective walls of said recess. The lever is provided with a heel 74 arranged to contact the other end of the friction-band for expanding the friction-band, when desired, in order to cause its peripheral friction face to frictionally engage the inner peripheral friction face of the wall 28 of the box.

A wedge-slide 75 is arranged to slide in a recess 76 in the block between the wings 46, 47, the bottom of said recess forming a guideway for said slide, said guideway being extended along the hub 57 of said block. The wedge-face 77 of said slide is arranged to coact with the lever 68, being shown as arranged to contact a rounded inner end of an adjusting screw 78 adjustable in the respective limbs 80, 81, of the split end of the lever 68, the said walls having a slot 82 between them. A clamping screw 83 is arranged to clamp the threads in said walls against the threads in the wall of the adjusting screw for holding the adjusting screw in adjusted relation.

A spring 85, fixed in a recess 86 of the wing 47, by means of a screw 87, engages the inner end of the lever 68 to counteract the action of centrifugal force on said inner end and to normally place the same in release position for release of the friction-band.

In order to adjust the adjusting screw 78 and the clamping screw 83, the friction-band is provided with a slot 88 with which a threaded hole 89 in the peripheral wall of the box is arranged to register, a screw 90 normally closing said last-named hole.

A plurality of actuating devices is preferably provided for the friction-disks. Each of these preferably comprises a bearing lug 96 on one of the friction-disks. Links 97 are articulated with said bearing lug by means of a pin 98 passing through said lug and said links.

A roller 101 is on a pin 102 passing through said roller and through apertures in the other ends of said pair of links 97. The other of said friction-disks is provided with hardened contact-plates 104 having shanks let into holes 105 in said friction-disk. The rollers contact said hardened contact-plates.

Means are provided for moving said links toward and away from lines parallel with the axis of rotation of the clutch, the said rollers moving along said contact-plates and acting to separate said friction-disks when said links are moved toward lines parallel with said axis of rotation in order to cause engagement between the friction-faces on said friction-disks and the coactive friction-faces in the box, respectively on the radial wall of the box and the cap of the box. The movement of said rollers away from parallelism with said axis of rotation causes relief of pressure between said friction-faces for releasing driving engagement between the same. Movement of each of said rollers is exemplified as accomplished by means of links 107 articulated with the pin 102 and articulated by a pin 108 with a slide 109. The slides are arranged to slide in guideways 110, 111, in said block and its hub for causing movement of said links and rollers.

A pair of links 97 and a pair of links 107 coact with one of the rollers 101, so as to form a set of operating devices for the friction-disks, a pair of these operating devices being exemplified, the respctive operating devices being received in recesses 112, 113, respectively between the wings 46 and 48, and between the wings 47 and 49, the walls of said recesses holding the parts in place, so that in assembling, the pins may be merely slipped into their holes and the links and lugs and rollers placed in the respective recesses.

Means are provided for simultaneously operating the wedge-slide 75 and the operating slides 109, as by fixing the same respectively to a slidable collar 115 by means of screws 116, 117. Suitable means may be provided for moving the collar axially, as by providing the same with an annular groove 118. The tines of a suitably forked lever, not shown because well known, may be received in said annular groove and be suitably operated for moving said collar lengthwise of the shaft in order to move the slides into engaging or disengaging relation.

The friction-band and the friction-disks are respectively provided with beveled edge faces 120, 121, 122, at the sides thereof distanced from their friction-faces to provide clearance and to permit maximum area of friction surfaces to be employed.

A collar 123 is fixed to the shaft to hold the hub 22 between it and the block 45, and a collar 124 is fixed to the shaft to limit outward end movement of the collar 115.

The operative relation of the wedge-face 77 on the wedge-slide 75 and the movement of the friction-disks by means of the rollers 101, may be such that frictional engagement between the friction-band and its coacting annular friction surface may be effected prior to operative engagement between the friction-disks and the side friction faces of the friction-box. This has the effect of permitting a preliminary driving relation to be effected between the end elements prior to complete operative driving relation between all of the friction faces, in order to permit gradual starting of the end element at rest and to avoid shock.

This relation may be effected by the adjustment of the adjusting screw 78 and by having the wedge-face 77 of such inclination and length that driving engagement of the friction-band is effected prior to completion of axial movement of the slidable collar 115, the inner end of the adjusting screw 78 riding on the upper face 125 of said slide during the latter portion of engaging movement of the collar, during which latter portion of engaging movement of the collar the driving connection of the friction-disks is effected.

I have, in Figs. 15 and 16, shown a modification of the lever for operating the friction-band. In this modification the friction lever is a divided friction lever, consisting of the parts 131, 132. The part 131 is provided with a heel 133 arranged to make engagement with the end of the friction-band, and is pivoted on a pivot-pin 134 received in the walls of the recess 69 in the wing 46. The parts are articulated together by a pin 135. The part 132 has an adjusting screw 136 therein arranged to contact the part 131 between its pivot and the articulating pin, to adjust the moment of operative engagement of the friction-band. The inner end of the part 132 is provided with an antifriction roller 138 arranged to be engaged by the wedge-slide 139 similar to the wedge-slide 75.

A spring 141 is fixed to the inner block by a screw 142 and is arranged to bear against the part 132 adjacent to its articulated point, in order to normally hold the lever inwardly. The friction-band 29' is provided with a cleat 62' similar to cleat 62. A threaded hole 89' in the peripheral wall of the box is arranged to register for adjusting the screw 136, a screw 90' normally closing said last-named hole.

I have, in Figs. 17 and 18, shown a modification of the separating means for the friction-disks. In this modification toggle-links 145, 146, are located between the friction-disks. The inner ends of the toggle-links are articulated together by a pin 147, the outer ends of the toggle-links being articulated with the respective friction-disks by means of pins 148, 149, in the separated ends of said links and in lugs 151, 152, extending inwardly from said respective friction-disks 35', 36'. An operating link 154 is articulated with the pin 147 and with a pin 158 on a slide 109', corresponding with the slide 109, the slide 109' being connected to the slidable collar 115 similarly to the slide 109.

There is one of these operating devices in each of the recesses 112, 113. The movement of the connected ends of the toggle-links away from the axes of rotation of the end elements, that is, a movement of said links toward parallelism with said axes, causes operative engagement of the friction-disks with the side friction faces in the friction-box.

Having thus fully described my invention, what I claim as new and desire to secure by Letters Patent, is:

1. In a friction clutch, the combination of an annular friction-band and a friction-disk at each edge of said friction-band, parts which coact with said friction-band and said friction-disks to transmit motion, said annular friction-band and each of said friction-disks being beveled at their proximate edges whereby the inner ends of said friction-disks extend within said friction-band and the outer edges of said friction-disks extend within the cylindrical projection of the outer periphery of said friction-band, and means for expanding said friction-band and separating said friction-disks for coaction with said parts to transmit motion.

2. In a friction clutch, the combination of an annular friction-band, a friction-disk at each edge of said friction-band, an annular friction-wall coacting with said friction-band, side friction-walls coacting with said friction-disks, and means in the space between said friction-disks within said annular friction-wall for moving said friction-disks and said friction-band into friction engagement with said friction-walls.

3. In a friction clutch, the combination of an annular friction-band, a friction-disk at each edge of said friction-band an annular friction-wall coacting with said friction-band, side friction-walls coacting with said friction-disks, a lever and links within said annular friction-wall and between said friction-disks coacting respectively with said friction-band and said friction-disks to move the same into friction engagement with said friction-walls, and an operative device for combinedly moving said lever and links.

4. In a friction clutch, the combination of an annular friction-band, a friction-disk at each edge of said friction-band, an annular friction-wall coacting with said friction-band, side friction-walls coacting with said friction-disks, a lever and links within said annular friction-wall and between said friction-disks coacting respectively with said friction-band and said friction-disks to move the same into friction engagement with said friction-walls, and an operative device for combinedly moving said lever and links, said last-named means comprising means whereby to time the operating relation between said lever and links.

5. In a friction clutch, the combination of a pair of end elements, an annular friction-wall and side friction-walls having operative connection with one of said end elements, an inner block having connection with the other of said end elements, a friction-band about said block, friction-disks at the respective ends of said block, said friction-band and said friction-disks having driving connections with said block, said block provided with recesses, an operating lever for said friction-band in one of said recesses, links in others of said recesses for spreading said friction-disks, and slide means for said lever and links having sliding connections in said block and having operative connections with said lever and links.

6. In a friction clutch, the combination of a friction-box having side friction-walls and an annular friction-wall, adjusting means between said side friction-walls for adjusting the distance between them, an annular friction-band, a lever for moving the latter into friction engagement with said annular friction-wall, friction-disks between said side friction-walls, pivoted link means between said friction-disks for separating the latter into friction engagement with said side friction-walls, operating means for said lever and said links, and means whereby to adjust the operative relation between the latter and said lever.

In testimony whereof, I have hereunto signed my name in the presence of two subscribing witnesses.

ANTON MILL.

Witnesses:
THERESA M. SILBER,
DAWSON E. BRADLEY.